Patented Aug. 26, 1952

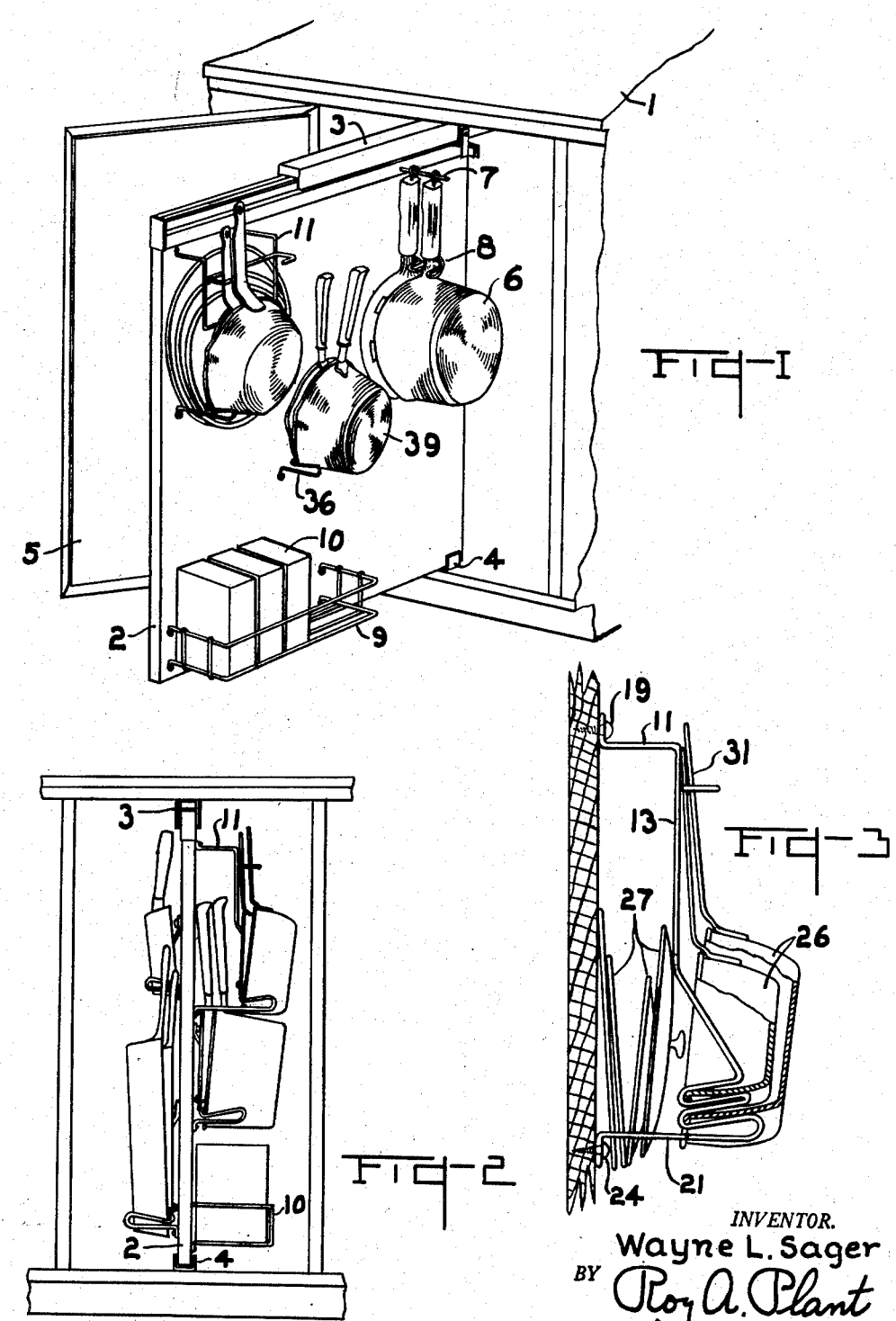

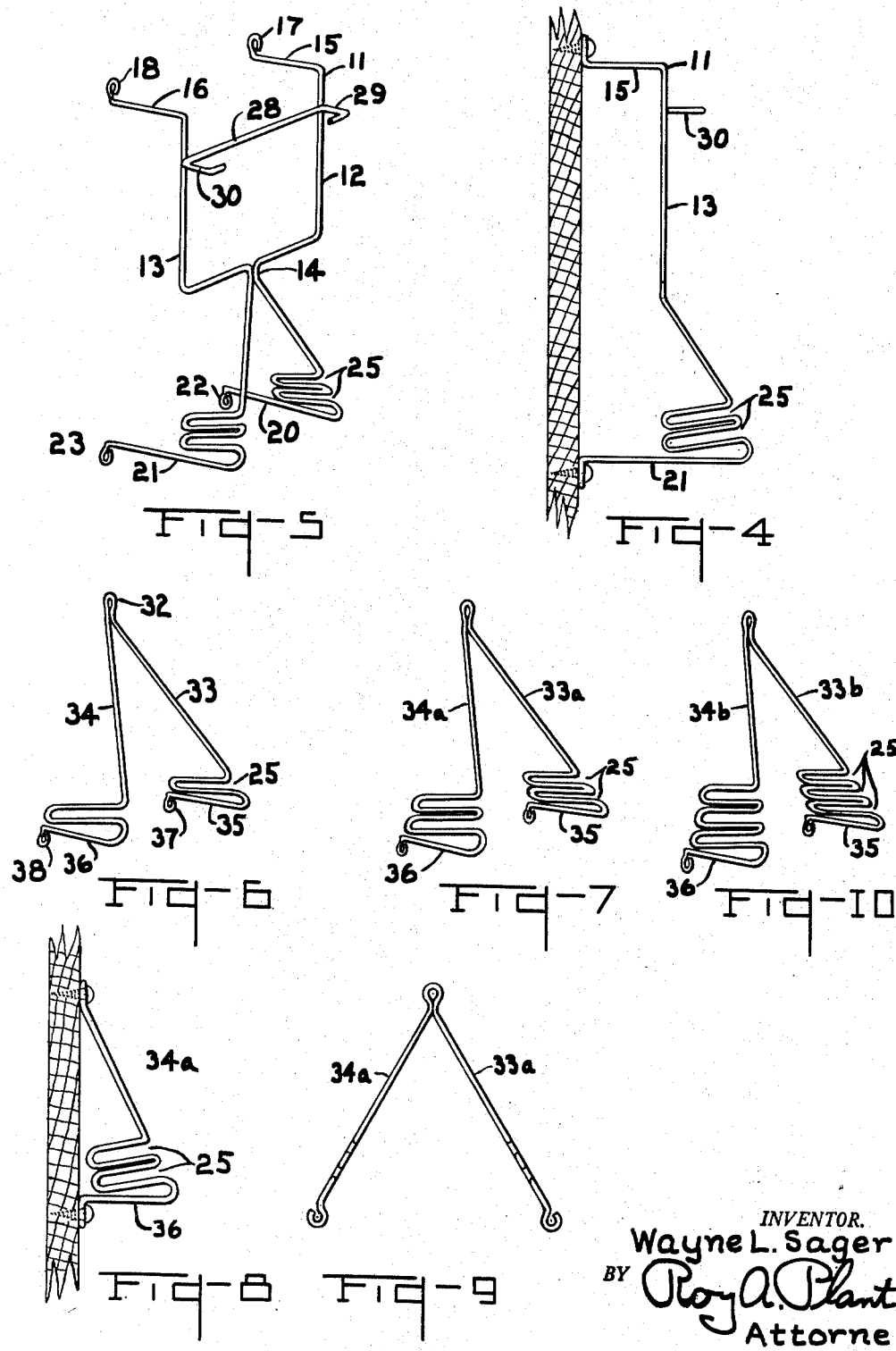

2,608,305

UNITED STATES PATENT OFFICE 2,608,305

POT AND PAN MOUNTING APPARATUS

Wayne L. Sager, Grand Rapids, Mich.

Application November 22, 1948, Serial No. 61,359

6 Claims. (Cl. 211—49)

1

The present invention relates broadly to kitchen equipment used in the storing of pots and pans, and in its specific phases to a sliding panel assembly as well as the pot and pan supporting means thereon, said pot and pan supporting means being preferably made of heavy wire shaped to hold the extending flanges of pots and pans placed thereon.

The storing of pots and pans is a problem which is present in every home having cooking facilities as well as every restaurant or other place of permanent construction wherein cooking is involved. It has been almost universal practice to have eye members in the ends of the handles of heavy handled cooking utensils or perforated holes in the ends of stamped metal handles, and then using these eyes or handle openings for hooking the handled utensil on nails or hooks fastened on the wall. Drawers have been used quite commonly for stacking cooking utensils, and some stoves are built with a drawer for that purpose. Open top wall racks are also used for holding some forms of pans, and quite commonly for holding covers. These procedures generally are of makeshift nature and many times are unsanitary due to being of exposed construction. However this practice is of such long standing that people have become used to it and unthinkingly put up with it even though not wholly satisfactory. It was a recognition of these conditions, and a decision that something should be done about it, which lead to the conception and development of the present invention.

Accordingly among the objects of the present invention is the provision of a new type of pot, pan, and cover supporting arrangement.

Another object is to provide a sliding panel which may be mounted individually in a cabinet unit, or under a work counter with closable front, or the like, and wherein such panel carries an improved means for supporting pots, pans, and covers thereon.

Another object is to provide a wire construction rack for pots and pans, and in some cases including covers, wherein such rack holds the pots and pans by the extending flange edge of same.

Another object is to provide a wire rack construction pot and pan holder which grips the pots and pans by their extending flanged edge, and also has a member for stabilizing the handles of the pots and pans against sidewise slippage and in some cases forward tilting.

Another object is to provide a wire rack adapted to hold a series of pots and pans in nested position by gripping the extending flanged edges of same.

A still further object is to provide a pot and pan mounting apparatus adapted to hold same by means of their extending flanged edges, wherein the lower portion of said flanged edges are cradled at two spaced apart points by such apparatus which is simple, efficient, sanitary, easily constructed, and exceptionally handy.

Still further objects and advantages of the invention will appear as the description proceeds.

To the accomplishment of the foregoing and related ends, the invention, then, consists of the pot and pan storage apparatus hereinafter fully described and particularly pointed out in the claims, the annexed drawings and the following description setting forth in detail certain means for carrying out the invention, such disclosed means illustrating, however, but several of various ways in which the principle of the invention may be used.

In the annexed drawings:

Figure 1 shows a perspective view of an assembly of a preferred combination of apparatus incorporating the present invention, and with kitchen equipment mounted thereon to illustrate its use.

Figure 2 shows an end view of the assembly illustrated in Figure 1, with variations in the kitchen equipment mounted thereon.

Figure 3 shows a side view of a preferred form of the wire construction pan and cover holder loaded with kitchen equipment, illustrated in partial section, and mounted on a panel which may be either stationary or movable.

Figure 4 shows a side view of the wire construction pan and cover holder of Figure 3 without the pans and covers mounted thereon.

Figure 5 shows a perspective view of the pan and cover holder illustrated in Figure 4.

Figure 6 shows a simplified form of the pan holder of the present invention wherein same is constructed to only hold one pan by two circumferentially spaced points of its extending side flange.

Figure 7 shows a modification of the Figure 6 construction wherein same is formed to hold two nested pans by their extending side flanges. Figures 8 and 9 are side and front views, respectively, of the pan holder of Figure 7.

Figure 10 shows a further modification wherein the pan holder is adapted to hold three nested pans by their extending side flanges.

Referring more particularly to Figures 1 and 2 of the drawings, it will be noted that the assembly is shown as built into a kitchen counter assembly 1 and wherein there is an edgewise movable panel 2, which has been pulled out of the counter in position for use, with said panel supported on a cradle suspension assembly 3. The lower edge of the panel 2 may be stabilized against sidewise swinging by any suitable means such as a substantially U-shaped guide member 4 mounted on the bottom of the kitchen counter assembly as shown. With the unit pushed back into the counter, door 5 may be closed to shut in the kitchen utensils where they are out of the way and may be kept in sanitary condition. Where the kitchen counter is sufficiently deep and an exceptional amount of pots and pans are used, the sliding panel may, if desired, be so mounted as to leave considerable clearance between its outer edge and the door, and in those cases additional pot and pan holders may be mounted on the inner face of the door as is diagrammatically illustrated in the constructions shown in Figures 3 and 8.

In order to show the versatility of this sliding panel construction, Figure 1 illustrates the mounting of a pair of heavy pans 6 with eyes on the end of their respective heavy handles, and wherein such eyes engage an extending supporting pin 7. A handle stabilizer 8 is preferably used in this case to hold the pans against backward swinging and also against accidental outward sliding on supporting pin 7. A rack 9 for packages of soap 10, or the like, may also be provided on panel 2.

Very commonly there is not only the problem of where to store pots and pans in the kitchen, but also the one of storing covers for those pots and pans. Both of these problems can be readily met by using the construction illustrated in Figures 3, 4, and 5. This construction, which is in the form of rack 11, basically uses a pair of heavy wire construction right and left side members 12 and 13 which may be joined together at their point of contact 14 by spot welding or any other convenient procedure. The upper end of these side members respectively have projecting legs 15 and 16 with eyes 17 and 18 at their end for fastening onto a wall or panel by means of screws 19, or the like, Figure 3. The portion of right and left side members 12 and 13, extending downward from projecting legs 15 and 16, is preferably parallel to the wall or panel on which the assembly is mounted. From point of contact 14, Figure 5, these members preferably diverge and incline outward in a direction which is preferably generally radial of the pan to be mounted thereon, and are provided with downward and backward inclined slots 25 of general hairpin construction for receiving, and stabilized double gripping of, the extending side flange of a pot or pan 26, all of which is facilitated by said diverging and outward inclining construction as is specifically shown in Figure 3. These bent portions terminate in lower legs 20 and 21, the free ends of which have eyes 22 and 23 adapted to be anchored to a wall or panel by means of screws 24. Where two of these hairpin shaped slots 25 are used per side member, then two pans can be mounted thereon as is shown in Figure 3. However, the invention is not limited to two such slots since obviously one or more slots may be used without departing from the spirit of the invention. This type of construction leaves space behind the pots and pans for the storage of covers 27, or the like, the lower edge of each of which rests on lower legs 20 and 21 of the assembly, thus producing a very compact arrangement.

In order to make the assembly shown in Figures 3, 4, and 5 still more rigid while supplying a handle rest, same may be provided with an upper cross support member 28 which may be spot welded or otherwise conventionally fastened on right and left side members 12 and 13. This cross support member preferably has its ends 29 and 30 turned outward and then toward each other a short distance to form pockets against which handles 31 of pots 26, or the like, may rest and be held against rotary movement as well as outward tilting under conditions of use.

In some cases it is not necessary to supply a cover holder, and it may be desired to only support a single pan. To take care of this the pot and pan holder illustrated in Figure 6 may be used. This construction is preferably made from a single piece of wire with an eye 32 in its upper end. From this eye the side members 33 and 34 diverge and incline outward to a single slot 25 in each which terminates in legs 35 and 36 having eyes 37 and 38 in their respective ends, with all of said eyes being anchorable to a panel or wall by means of screws, or the like, as previously described.

The construction shown in Figures 7, 8, and 9 is quite similar to that of Figure 6 except that a pair of slots 25 are provided in each side member so as to permit the nesting of two pans as is typically shown in Figures 1 and 2. In some cases there are three or more nesting pans to a set and in that case the pan supporting member would be provided with a corresponding number of slots 25 in each side member. Figure 10, for instance, illustrates one such construction with three slots in each side member which thus will hold a group of three nesting pans.

In actual use the sliding panel, as shown in Figures 1 and 2, will have various forms of these pan mounting assemblies fastened thereon, and same normally will be mounted on both sides of the panel as is typically shown in Figure 2. The width of the opening into which the panel slides may be varied over a considerable range depending upon the size and type of pans, et cetera, to be carried by the panel, but for most purposes a space of from 14 to 20 inches wide will take care of the pot and pan requirements of most homes.

In preferred construction, each slot of the pan mounting assembly is suitably deep and its open end offset outward from the mounting panel a sufficient amount to permit the side flange of a pan to enter a considerable distance into the slot, as is typically shown in Figure 3. The width of each of these slots and their downward angle of incline is also preferably such that the flanges of the pots and pans may be readily slid thereinto and yet in preferred construction there will be just a slight amount of binding on the average pan so as to hold same tightly against rattling. There is no harm, however, in having the slots a trifle wider while inclined sufficiently to hold the pans. This situation will only allow the handle portion of the pans to incline outward slightly as is typically shown by pans 39 in Figure 1.

Either round or other shaped wire, preferably steel, may be used to make the pot and pan engaging unit, and for ordinary light weight pans a round cross-section wire one-eighth inch in diameter is generally suitable. Heavier wire can be used if desired, and round steel wire of .140"

diameter has been found very satisfactory for use in these units for holding and storing cast iron frying pans as well as light weight pans.

In actual practice, it is found that this type of construction is much more easy to use than is the old-style plan of hanging pots and pans on nails or hooks from eyes or holes in the ends of the respective pot and pan handles. In fact, by having the present assembly in a cabinet, or a kitchen counter, the panel can be slid outward and the desired pot or pan removed without getting down on one's hands and knees, which would be necessary to pick such utensil off of a shelf under a kitchen counter. In fact this procedure is even easier than picking a pan out of a drawer, a procedure which is unsatisfactory due to piling and the denting or other injury which invariably accompanies the drawer type of pot and pan storage.

Other modes of applying the principle of my invention may be employed instead of those explained, change being made as regards the pot and pan storage apparatus herein disclosed, provided the means stated by any of the following claims or the equivalent of such stated means be employed.

I therefore particularly point out and distinctly claim as my invention:

1. A pan storage apparatus including a pair of outwardly projecting side members diverging laterally in a downward direction from mounting means at its upper end, the lower end of each side member being reversely bent rearwardly and then forwardly to provide a narrow slot rearwardly of each side member with the lower terminal portion of the side member extending rearwardly below the slot with mounting means at the end thereof, the upper and lower mounting means lying in substantially the same plane and the slots in said side members being positioned in a single arc for receiving and holding the lower edge portion of the extending flange of a pan mounted thereon with the side members extending generally radially of the bottom of said pan.

2. A pan storage apparatus as in claim 1, wherein a series of reverse bends are provided at the lower end of each side member to form a series of pan flange-receiving slots with corresponding slots of the two side members arranged in successive arcs of increasing radius for the reception and nesting of pans.

3. A pan storage apparatus which has two side members formed from heavy wire, the upper portion of said side members being spaced apart, means for anchoring said side members together at the bottom of said spaced apart upper portion, said side members diverging sidewise and outward below said point of anchoring, at least one backward extending and downward inclined outward-opening hairpin shaped portion in the lower part of said outward projecting portion of each of said side members, said anchoring together of the side members stabilizing the assembly while the sidewise and outward diverging of same results in said hairpin-shaped portions lying in a single arc for the holding of the lower portion of the extending flange of a pan mounted thereon, substantially equal length upper and substantially equal length lower legs on the upper and lower ends of said side members, and means on the ends of said legs for use in anchoring said apparatus on a suitable surface, said legs being of a suitable length and spacing for use in the edgewise storing of the cover of said pin behind the diverging portion of said assembly.

4. A pan storage apparatus as set forth in claim 3, wherein there is a cross support member joining the upper portion of said side members, said cross support member acting as a support for a handle on said pan.

5. A storage apparatus for nesting pans, said apparatus having two side members formed from heavy wire, the upper portion of said members being spaced apart, means for anchoring said side members together at the bottom of said spaced apart upper portion, said side members extending downward, outward, and diverging sidewise below said point of anchoring, multiple backward extending and downward inclined outward-opening closely spaced hairpin shaped portions at the lower end of the diverging portion of said side members, the slots of said hairpin shaped portions being substantially equal in depth to the amount of outward extension of the diverging portion of said side members at the corresponding hairpin shaped portion, said anchoring together of the side members stabilizing the assembly while the sidewise and outward diverging of same presents the slots of corresponding hairpin shaped portions of the side members in a single arc with succeeding corresponding slots in the side members in arcs of increasing radius for holding the lower portion of the extending flange of a pan mounted thereon, substantially equal length upper and substantially equal length lower legs on the upper and lower ends of said side members, and means on the ends of said legs for use in anchoring said apparatus on a suitable surface, said legs being of a suitable length and spacing for use in the edgewise storing of the covers for said pans behind the diverging portion of said assembly.

6. A pan storage apparatus as set forth in claim 5, wherein there is a cross support member rigidly joining the upper portion of said side members, the ends of said cross support member extending outward and then a short distance toward each other to form holding pockets for the handles of the pans stored on said apparatus.

WAYNE L. SAGER.

REFERENCES CITED

The following references are of record in the file of this patent:

UNITED STATES PATENTS

| Number | Name | Date |
| --- | --- | --- |
| 262,556 | Bailey | Aug. 15, 1882 |
| 680,450 | Aiken | Aug. 13, 1901 |
| 791,107 | Padden | May 30, 1905 |
| 904,080 | Orin | Nov. 17, 1908 |
| 1,163,038 | Robertson et al. | Dec. 7, 1915 |
| 1,178,104 | Robertson et al. | Apr. 4, 1916 |
| 1,266,245 | Fuhrmann | May 14, 1918 |
| 1,537,172 | Kottke | May 12, 1925 |
| 1,842,118 | Resnik et al. | Jan. 19, 1932 |
| 2,254,431 | Levine | Sept. 2, 1941 |

FOREIGN PATENTS

| Number | Country | Date |
| --- | --- | --- |
| 382,243 | Germany | Sept. 29, 1923 |
| 588,548 | France | Feb. 4, 1925 |